(12) United States Patent
Akiyama et al.

(10) Patent No.: US 6,860,110 B2
(45) Date of Patent: Mar. 1, 2005

(54) GAS TURBINE SHAFT AND HEAT SHIELD COOLING ARRANGEMENT

(75) Inventors: Ryo Akiyama, Hitachi (JP); Shinya Marushima, Hitachinaka (JP); Manabu Matsumoto, Ibaraki (JP); Masami Noda, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/653,086

(22) Filed: Sep. 3, 2003

(65) Prior Publication Data

US 2004/0042896 A1 Mar. 4, 2004

Related U.S. Application Data

(63) Continuation of application No. 09/949,821, filed on Sep. 12, 2001, now Pat. No. 6,655,153.

(30) Foreign Application Priority Data

Feb. 14, 2001 (JP) .................................... 2001-037566

(51) Int. Cl.[7] ............................. F02C 7/18; F04D 29/58
(52) U.S. Cl. .......................................... 60/806; 415/115
(58) Field of Search ........................... 60/806, 782, 785; 415/115

(56) References Cited

U.S. PATENT DOCUMENTS 4,793,772 A * 12/1988 Zaehring et al. ............ 415/175
5,054,996 A    10/1991 Carreno
5,593,274 A     1/1997 Carreno et al.
6,155,040 A    12/2000 Sasaki
6,185,924 B1    2/2001 Matsumoto et al.
6,224,327 B1    5/2001 Aoki et al.
6,293,089 B1 *  9/2001 Sasaki .......................... 60/806
6,435,812 B1    8/2002 DeStefano et al.
6,450,758 B1    9/2002 Schmidt
6,655,153 B2 * 12/2003 Akiyama et al. ............. 60/806

FOREIGN PATENT DOCUMENTS

JP    7-189739    7/1995
JP   11-50808     2/1999
JP   11-229804    8/1999

* cited by examiner

Primary Examiner—Ted Kim
(74) Attorney, Agent, or Firm—Mattingly, Stanger, Malur & Brundidge, P.C.

(57) ABSTRACT

A gas turbine having a rotor driven by a shaft with a cooling medium passageway therein has a heat shield pipe portion mounted inside the passageway which forms an air layer with a wall of the passageway to protect a bearing member metal supporting the shaft from the heat of a cooling medium and a seal shaft portion for forming a labyrinth seal to prevent leakage of the cooling medium are formed as one piece and constitute a heat shied seal pipe.

5 Claims, 4 Drawing Sheets

GAS TURBINE SHAFT AND HEAT SHIELD COOLING ARRANGEMENT

This is a continuation application of U.S. Ser. No. 09/949,821, filed Sep. 12, 2001, now U.S. Pat. No. 6,655,153.

BACKGROUND OF THE INVENTION

1. Technical Field

The present invention relates to a gas turbine, and in particular, to a gas turbine in which a cooling medium is supplied from a center hole of a rear portion shaft which is supported by bearing members having bearing member metals and wherein rotor blades of a turbine rotor are cooled by the cooling medium.

2. Prior Art

In general, a turbine rotor of a gas turbine has a structure in which plural turbine discs having rotor blades at an outer periphery thereof, are arranged in an axial direction, and to the most front portion side (an upstream side of a gas path which is a combustion gas flow passage of an inner portion of a turbine part) and to the turbine discs at a rear portion side a hollow pipe shape shaft portions are installed, respectively, and are combined as one body. Further a shaft portion of a rear portion side turbine disc, namely a rear portion shaft, is supported by bearing members having bearing member metals to a main body standstill or stationary side.

Gas turbines have had a tendency to heighten year by year the combustion temperature so as to improve an efficiency of the gas turbine. Accordingly, a rotor blade portion for recovering the energy of the combustion gas of a gas turbine rotor is exposed to the combustion gas having a higher temperature than a heat resistance temperature of the constituting materials of the rotor blade. Therefore, the compressed air generated by a compressor and the stream from a stream turbine are used as a cooling medium and this cooling medium is supplied in an interior portion of the rotor blade and a rotor blade portion is cooled.

In the conventional techniques, as a general rule there is an open cooling system in which a cooling medium after the cooling of the rotor blade is exhausted into the combustion gas.

Recently, with the aim of improving the utilization efficiency of the compressed air etc. and also for preventing the lowering of a turbine output, it has been proposed to have a closed cooling system in which the cooling medium after the cooling of the rotor blade is not exhausted into the combustion gas but is recovered in the interior portion of the gas turbine rotor and is reused as the combustion use air etc. Relating to this closed cooling system, as a recovery system of the cooling medium after the cooling, two systems have been developed. These are a system in which a recovery passage is provided at a front portion side of a turbine portion (hereinafter, called a "front portion recovery system") and a system in which a recovery passage is provided at a rear portion side of the turbine portion (hereinafter, called a "rear portion recovery system")

As the prior techniques of the front portion recovery system, there are the techniques shown in Japanese application patent laid-open publication Hei 11-50808 and Japanese application patent laid-open publication Hei 11-229804.

In the prior technique shown in Japanese application patent laid-open publication Hei 11-50808, an interior portion of a center hole of a rear portion shaft has a triple pipe structure in which two partitioning wall pipes having a large diameter and a small diameter of two different diameters are arranged in the same axial center position. A passage, which is formed in an interior portion of a small diameter partitioning wall pipe being positioned at the most center, is used as a supply passage of the cooling medium and a passage, which is formed between the small diameter partitioning wall pipe and a large diameter partitioning wall pipe, is used as an air passage for protecting bearing member metals from the heat of the cooling medium.

In the prior technique shown in Japanese application patent laid-open publication Hei 11-229804, as shown in FIG. 1 thereof, a rear portion shaft has a heat shield seal pipe which is arranged at a center hole thereof and a seal shaft which is arranged in series at a rear portion of the heat shield seal pipe. The heat shield seal pipe forms an air layer for protecting the bearing member metals from the heat of the cooling medium between an inner wall of the rear portion shafts. The seal shaft forms a labyrinth seal between opposed faces of a main body stationary side which encloses an outer wall thereof and prevents from leaking the cooling medium between the gas turbine rotor and the main body standstill side. The heat shield seal pipe and the seal shaft have respectively flanges and these flanges are installed through a bolt connection to a rear portion end face of the rear portion shaft.

As the front portion recovery system, there is Japanese application patent laid-open Publication Hei 7-189739, as shown in FIG. 1 thereof, to the most front portion side turbine disc, a recovery passage is provided and then a construction of a cooling medium recovery passage in an interior portion of a rear portion shaft can be omitted and then an interior portion structure is simplified.

However, in the above stated prior techniques, there are following problems.

In the prior techniques as the rear portion recovery system shown in Japanese application patent laid-open publication Hei 11-50808 and Japanese application patent laid-open publication Hei 11-229804, since the large partitioning wall pipe is arranged in the interior portion of the center hole of the rear portion shaft and plural medium passages (two passages of a supply use passage and a recovery use passage) are formed, inevitably it is necessary to have a large number of components and many connection portions thereof and the interior portion structure becomes complicated. Accordingly, assembly during the manufacture time becomes difficult. As a result, this requires a long period for manufacturing time and increases the cost.

In particular, in the prior technique shown in Japanese application patent laid-open publication Hei 11-50808, the two partitioning wall pipes have large size members and the front end portions of the two partitioning wall pipes form taper shape flange portions and connect them to a rear portion side turbine disc. Thus the above structure becomes complicated.

Further, the structure shown in Japanese application patent laid-open publication Hei 11-229804, since in the heat shield seal pipe and the seal shaft the flanges are provided respectively and the flange is bolt connected to the rear portion end portion of the rear portion shaft, in the rear portion shaft the vibrations due to a centering displacement can occur easily. Namely, normally in the bolt connection using the flange, to the rear portion shaft being a base side of the installation a female screw is formed and to the respective flanges to the heat shield seal pipe at an installing side and the seal shaft a bolt insertion hole being a larger diameter of the bolt (a unloaded hole) is bored. Accordingly, during the bolt connection since a space is formed inevitably between the bolt and the bolt insertion hole and in a radial direction, the above space in the radial direction is formed in both of the heat shield seal pipe and the seal shaft. As a result, during the high rotation time of the gas turbine rotor, according to the minute unbalance by them, a centering displacement can occur easily and then the vibrations are induced easily.

Further, in the structure of the prior technique shown in Japanese application patent laid-open publication Hei 11-229804, since the heat shield seal pipe fit-into contacts only at a tip end contact portion to the center hole of the rear portion shaft, in this contact portion, the heat shield seal pipe is fixed in the radial direction and then the heat shield seal pipe does undergo a centering displacement. However, at a rear end side at the flange portion only the bolt connection is carried out, in the rear portion side of the heat shield seal pipe the vibrations due to the centering displacement can occur easily.

Further, in the heat shield seal pipe, in the tip end portion thereof a ring shaped contact portion for contacting the inner wall of the rear portion shaft is formed, an outer diameter of the tip end contact portion thereof is difficult to manufacture with the complete circle but it cause the scattering within the tolerance. Accordingly, since the tip end contact portion does not contact uniformly to a whole periphery of the inner wall of the rear portion shaft, the several spaces are formed between the inner wall of the rear portion shaft and in the peripheral direction. When the spaces are formed, the cooling medium for passing through the interior portion of the rear portion shaft enters into the air layer and then the heat shield effect of the air layer lowers.

Further, when during the operation time the heat shield seal pipe is destroyed at an axial direction central position thereof, the portion to be subjected the destroy moves to the front portion and scatters to a front portion space and further collides with the turbine disc, as a result the big vibrations occur, according to circumstances there is a afraid of the turbine disc may destroy.

On the other hand, in the prior technique as the front portion recovery system shown in Japanese application patent laid-open publication Hei 7-189739, since the component number installed in the interior portion of the rear portion shaft is lessened and the structure is simplified, the vibrations due to the centering displacement can be reduced. However, in this prior technique, the construction of the bearing member metals for protecting the heat of the cooling medium has not studied.

In generally, the heat resistance temperature of the bearing member metal is 100 C.–150 C. degree and when it exceeds over the heat resistance temperature there is an afraid of the fusion of the bearing member metal. However, in many cases before the cooling of the rotor blade the heat temperature of the cooling medium to be supplied is more than (about more than 200 C) the heat resistance temperature and when this heat is transmitted to the bearing member metal from the interior portion of the rear portion shaft there is a possibility in which the temperature of the bearing ember metal exceeds over the heat resistance temperature.

Further, the above stated problem will occur in the case of the open cooling system, accordingly when the construction for protecting the bearing member metal is studied, it is necessary to consider the simplification of the structure, the prevention of the generation of the vibrations, the lowering of the heat shield effect, and the scattering during the heat shield component destroy time, etc.

SUMMARY OF THE INVENTION

A first object of the present invention is to provide a gas turbine in which in a cooling medium is cooled by communicating the cooling medium in turbine rotor blades a heat shield effect for reducing a transmission of heat of the cooling medium to a bearing member metal can be obtained and further the gas turbine in which a structure is simplified and a manufacture is performed easily and during an operation time the vibrations due to a centering displacement can be provided.

A second object of the present invention is to provide a gas turbine in which in a cooling medium is cooled by communicating the cooling medium in turbine rotor blades a heat shield effect for reducing a transmission of heat of the cooling medium to a bearing member metal can be obtained and further the gas turbine in which a lowering of a heat shield effect hardly occur can be provided.

A third object of the present invention is to provide a gas turbine in which in a cooling medium is cooled by communicating the cooling medium in turbine rotor blades a heat shield effect for reducing a transmission of heat of the cooling medium to a bearing member metal can be obtained and further a scattering of a destroy component so as to provided to obtain the heat shield effect during a destroy time can be prevented.

(1) To attain the first object, the present invention is resides in that in a gas turbine comprising a turbine disc for constituting a turbine rotor and a rear portion shaft connected in a downstream side of a gas path of the turbine disc and supported by bearing members having bearing member metals in a main body standstill side, in the turbine disc a disc inside cooling medium passage is formed, in the rear portion shaft a center hole for communicating a cooling medium is formed, the cooling medium is supplied from a rear portion side of the rear portion shaft to the center hole, the cooling medium is communicated in an axial direction to direct from a rear portion side to a front portion side in the center hole and the cooling medium is led to the disc inside cooling medium passage, and the cooling medium is communicated in turbine rotor blades and the turbine rotor blades are cooled, the gas turbine characterized in that the gas turbine further comprising a heat shield seal pipe in which a heat shield pipe portion arranged the center hole of the rear portion shaft and for contacting to an inner wall of the rear portion shaft in a first contact portion which is positioned in a front portion side within an axial direction range of the bearing member metal and for forming an air layer between the inner wall of the rear portion shaft, a seal shaft portion positioned in a rear portion of the heat shield pipe portion and for preventing a leakage of the cooling medium between a face opposed to the main body standstill side, and a flange portion positioned between the heat shield pipe portion and the seal shaft portion are constituted as one piece component.

As stated in above, by a provision of a heat shield seal pipe having a heat shield pipe portion, a heat shield for reducing the heat transmission of the cooling medium to a bearing member metal can be obtained. Further, the heat shield seal pipe is constituted by a heat shield pipe portion, a seal shaft portion and a flange portion as one piece component and a component number for bolt connecting to a rear portion shaft becomes one and then a structure is simplified and a manufacture performs easily and the vibrations due to a centering displacement during an operation time hardly occurs.

(2) In the above stated gas turbine (1), the heat shield pipe portion of the heat shield seal pipe has a second contact portion for contacting the inner wall of the rear portion shaft in an axial direction position of the rear portion side of the radial direction range to which the bearing member is positioned.

According to the above, since the heat shield seal pipe contacts to the inner wall of the rear portion shaft in two portions comprising a first contact portion and a second contact portion by sandwiching the axial direction range to which the bearing member metal is positioned, the heat shield seal pipe is fixed surely in the radial direction and further during the operation time the vibrations due to the centering displace hardly generate.

(3) Further to attain the above stated second object, in the present invention, in the above stated gas turbine (1) or (2), the heat shield pipe portion of the heat shield seal pipe has at least a retrain tolerance having a fit-into construction.

Accordingly, since between the first contact portion and the inner wall of the rear portion shaft is fitted into closely ranging over the whole periphery, the entering of the cooling medium to the air layer can be prevented and the lowering in the heat shield effect to the bearing member metal hardly generates.

(4) Further, to attain the above stated third object, in the present invention, in any one of the above stated gas turbines (1)–(3), the rear portion shaft has a circumferential shape radial direction projection portion which is formed in an inner wall portion which is arranged adjacently to an end face of a tip end portion of the heat shield pipe portion.

At the worst the heat shield pipe portion may destroy, by the projection portion the front direction movement of the destroyed component can be stopped and then the scattering of the destroyed component in the front portion space of the rear portion shaft can be prevented.

DESCRIPTION OF THE INVENTION

Figure 1:
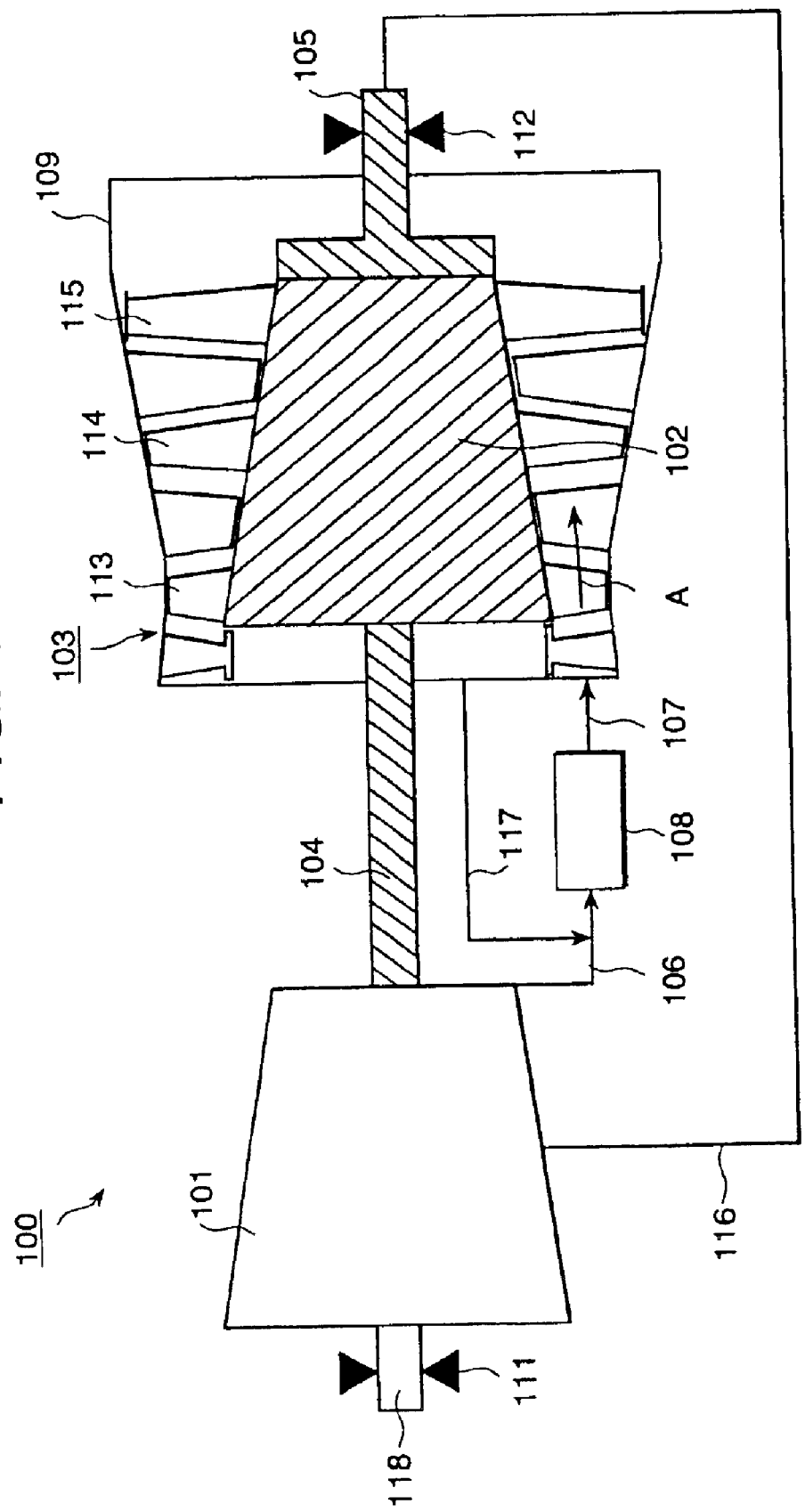
FIG. 1 is a view showing a whole construction of a gas turbine according to a first embodiment of the present invention.

Hereinafter, Embodiments of the present invention will be explained referring to the drawings.

FIG. 1 shows a view showing a whole construction of a gas turbine relating to a first embodiment according to the present invention.

In FIG. 1, a reference character 100 denotes a gas turbine, and this gas turbine 100 comprises, viewing from a flow direction A of a combustion gas, a compressor 101 which is positioned in a front portion (an upstream side), a turbine part 103 which is in a rear portion (an upstream side) and has a turbine rotor 102 in an interior portion thereof, an intermediate shaft 104 for connecting a rotating body (not shown in figure) in the compressor 101 and the turbine rotor 102 of the turbine part 103, a rear portion shaft 105 connected to a rear portion side of the turbine 102, a combustor 108 connected to the compressor 101 through a compressed air passage 106 and also connected to the turbine part 103 through a combustion gas passage 107, a cooling medium supply passage 116 in which a middle stage position of the compressor 101 is connected to a rear portion side of the rear portion shaft 105, a cooling medium recovery passage 117 in which a front portion side of the turbine part 103 is connected to a rear portion side of the compressed air passage 106, and bearing members 111 and 112 for supporting a shaft portion 118 of a front end portion side of the rotating body of the compressor 101 and the rear portion shaft 105.

In the turbine part 103, the turbine rotor 102 positions in an inner portion of a turbine case 109 and in an outer periphery of the turbine rotor 102 plural rotor blades 113, 114, and 115 are installed in a peripheral direction.

In the gas turbine 100 constructed in above, an operation fluid (the air) compressed by the compressor 101 is sent to the combustor 108 through the compressed air passage 106 and is burned by the combustor 108 and then the energy is heightened and further the combustion gas is sent to the turbine part 103 through the combustion gas passage 107 and the turbine rotor 102 is rotated, accordingly the energy of the combustion gas is recovered by the turbine part 103 and the electric generation etc. is carried out.

Further, a part of the air compressed by the compressor 101 is extracted as the cooling medium and is flown from a rear portion side of the rear portion shaft 105 through a cooling medium supply passage 116 and further is circulated in the turbine rotor 102 and interior portions of the rotor blades 113 and 114 and cools the first stage rotor blade 113 and the second stage rotor blade 114. The cooling medium after the cooling is returned to the compressed air passage 106 through the cooling medium recovery passage 117 and is reused as the combustion use air.

Figure 2:
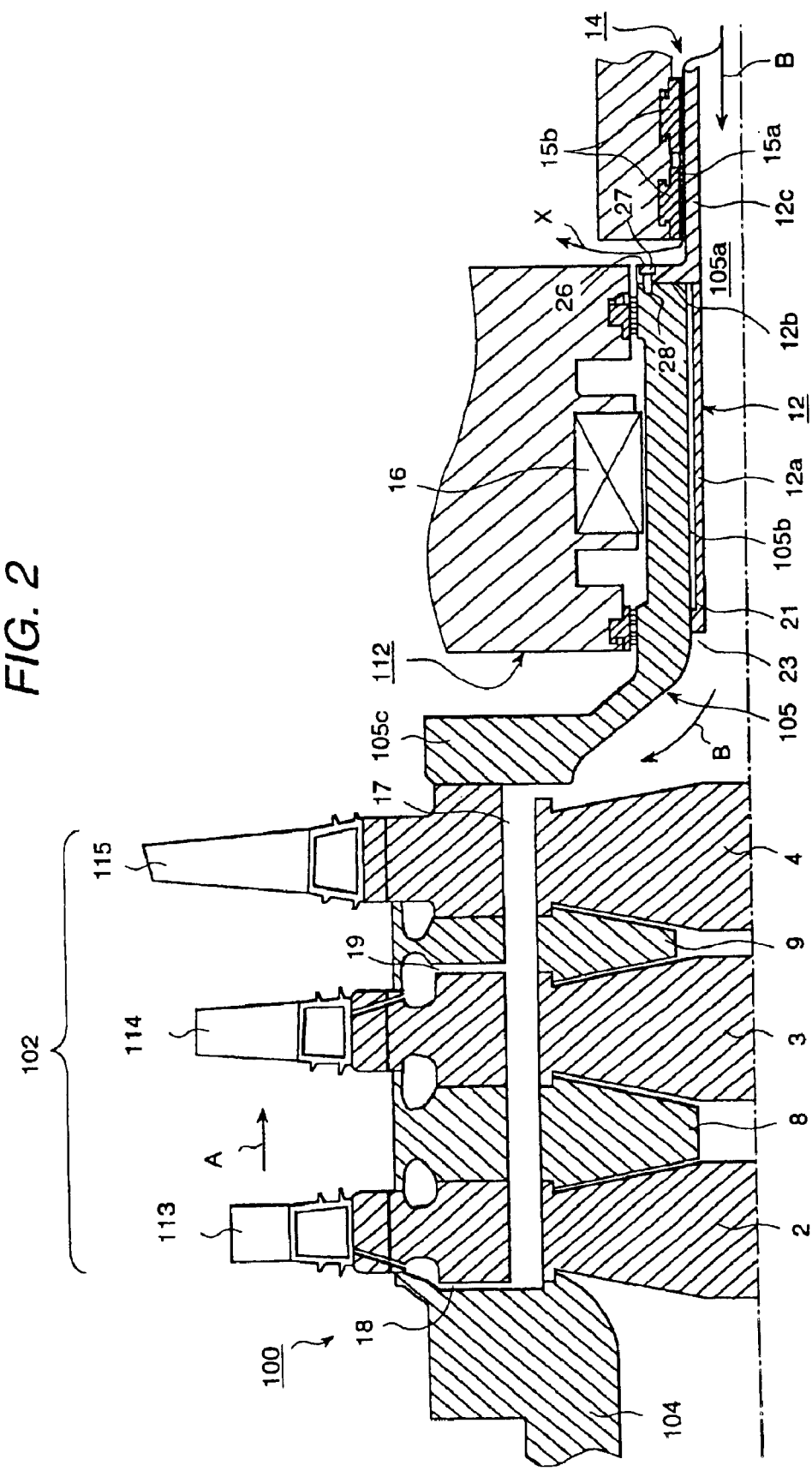
FIG. 2 is an enlarged cross-sectional view showing of an essential portion of the gas turbine according to the first embodiment of the present invention.

FIG. 2 is an enlarged cross-sectional view of an essential part of the gas turbine 100 according to the first carryout embodiment according to the present invention.

In FIG. 2, the turbine rotor 102 is constituted by a first stage turbine disc 2, a second stage turbine disc 3, a third stage turbine disc 4, the first stage rotor blade 113, the second stage rotor blade 114 and the third stage rotor blade 115 which are installed in the outer peripheries of the respective stage turbine discs, and spacers 8 and 9 arranged between the respective stage turbine discs.

The turbine discs 2, 3 and 4 of the respective stages are overlapped in an axial direction by sandwiching the respective spacers 8 and 9, in a front portion side portion of the first stage turbine disc 2 the intermediate shaft 104 is mounted, at a rear portion side of the rear portion shaft 105 a rear portion shaft flange 105c of the rear portion shaft is mounted and these members are connected strongly together by a stacking bolt (not shown in figure) for penetrating through the respective members.

The rear portion shaft 105 is a hollow pipe shape in which a center hole 105a is formed and a rear portion thereof forms a substantially cylindrical shape and a front portion thereof spreads with a taper shape and in a tip end thereof the rear portion shaft flange 105c is formed.

The bearing member 112 has a bearing member metal 16 which is positioned in a main body standstill side and according to this bearing member metal 16 the cylindrical shape portion of the rear portion shaft 105 is supported rotatably.

In the turbine discs 2, 3 and 4 and in the interior portions of the spacers 8 and 9, a disc inside cooling medium passage 17 which extends in the axial direction from the rear side portion of the third turbine disc 4, is provided. Further, the respective disc inside cooling medium passage 17 passes through to a first turbine cooling main pipe 18 and a second turbine cooling main pipe 19 and is communicated to the interior portions of the first stage rotor blade 113 and the second stage rotor blade 114.

As stated in above, the cooling medium from the compressor 101 flows in an arrow B direction from the rear portion of the rear portion shaft 105 and passes through the center hole 105a of the rear portion shaft 105 and flows into the disc inside cooling medium passage 17 and passes through the first turbine cooling main pipe 18 and the second turbine cooling main pipe 19 and is led to the interior portions of the first stage rotor blade 113 and the second stage rotor blade 114 and then the cooling of the respective rotor blades is carried out.

The heat shield pipe portion 12a is fitted into the cylindrical shape portion of the rear portion shaft 105 and forms an air layer 21 between an inner wall 105b of the rear portion shaft 105 and itself. Further, in a tip end of the heat shield pipe portion 12a a contact portion 23 for contacting the inner wall 105b of the rear portion shaft 105 in a front portion side in an axial direction range in which the bearing member metal 16 is positioned is provided and this contact portion shuts off the communication between the center hole 105 and the air layer 21.

The seal shaft portion 12C projects and is positioned on an outer side of the rear portion shaft 105. On an outer periphery of this portion, plural radial direction fins 15a are formed. These radial direction fins 15a form a labyrinth seal 14 by cooperating with plural radial direction fins 15b which are formed in an inner peripheral face of the main body standstill side.

The flange portion 12b is provided to bolt connect the heat shield seal pipe 12 to a rear portion end face of the rear portion shaft 105 and to a side face of the flange portion 12b in which plural hold insertion holes are formed in a circumferential direction. The side face of the flange portion 12b is adhered closely to the rear portion end face of the rear portion shaft 105 and bolts 27 are inserted into the bolt insertion holes 26. To screw holes 28 provided in the rear portion end face of the rear portion shaft 105 since the bolts 27 are screwed into, the heat shield seal pipe 12 is fastened to the rear portion end face of the rear portion shaft 105.

Further, the heat shield pipe portion 12a, the flange portion 12b and the seal shaft portion 12c discussed above, preferably, are constituted as one integral piece made by an integral material.

Further, the heat shield seal pipe 12 can be constituted as one piece by joining separate bodies of the heat shield pipe portion 12a, the flange portion 12b and the seal shaft portion 12c according to the welding manner, etc.

Hereunder, an operation of the heat shield seal pipe 12 constituted in above will be explained.

In the gas turbine 100 according to this carryout embodiment, the cooling medium is supplied from the rear portion of the rear portion shaft 105 in an arrow B direction. Some leakage of the cooling medium occurs in an arrow X direction. To ensure fully the cooling medium for cooling the first stage rotor blade 113 and the second stage rotor blade 114, it is necessary to estimate the leakage amount in the arrow X direction in advance and to supply the cooling medium with the leakage amount at the outside. When the leakage amount in the arrow X direction is large, the efficiency of the gas turbine 100 lowers. According to the labyrinth seal 14 formed between the seal shaft portion 12c of the heat shield seal pipe 12 and the main body standstill side, the leakage amount of the cooling medium in the arrow X direction becomes small and the efficiency of the gas turbine can be improved.

The heat resistance temperature of the bearing member metal 16 is generally 100 C.–150 C. degree and when it exceeds over the heat resistance temperature there is a possibility in which the bearing member metal 16 may melt. However, in many cases the heat of the cooling medium supplied from the rear portion of the rear portion shaft 105 is more than the heat resistance temperature of the bearing member metal 16. When the heat transmits to the bearing member metal 16 from the interior portion of the rear portion shaft 105 according to the heat transmission, there is a possibility that the temperature of the bearing member metal 16 exceeds over the heat resistance temperature. By the provision of the air layer 21 between the heat shield pipe portion 12a and the inner wall 105b of the rear portion shaft 105, the heat passing-through efficiency of that portion decreases, the heat of the cooling medium passed through the center hole 105a of the rear portion shaft 105 hardly transmits to the bearing member metal 16 which is positioned in the outer periphery of the rear portion shaft 105. As a result, the temperature of the bearing member metal 16 can be restrained less than 100 C–150 C.

Further, according to this carryout embodiment, the heat shield pipe portion 12a, the flange portion 12b and the seal shaft portion 12c are constituted as the one piece component. For this reason, in comparison with the heat shield pipe portion 12a and the seal shaft portion 12c or the heat shield pipe portion 12a, the seal shaft portion 12c and the flange portion 12b are constituted as the separate members, the number of the components can be lessened. Herein, during the operation time of the gas turbine 100, the heat shield seal pipe 12 rotates together with the rear portion shaft 105. When there is the unbalance in the rotating components, during the rotation time since it causes the vibrations, it is necessary to perform the centering to the heat shield seal pipe 12 during the manufacturing time. In this case, when the heat shield pipe portion 12a, the flange portion 12b and the seal shaft portion 12c of the heat shield seal pipe 12 are constituted the separate components, it is necessary to perform the centering to the respective components. According to this carryout embodiment, the heat shield pipe portion 12a, the flange portion 12b and the seal shaft portion 12c are constituted as the one piece component, the number of the components can be lessened and the deletion of the manufacture cost and the short time performance can be realized.

Further, when the heat shield seal pipe and the seal shaft are the separate components and to the respective component the flange is provided and the bolt-connection is performed to the rear portion shaft, there are many bolt connection portions and accordingly the vibrations due to the centering displacement generate easily.

According to this carryout embodiment, the flange portion 12b of the heat shield seal pipe 12 is one, the bolt connection portions reduce and the vibrations due to the centering displacement during the operation time hardly generate.

According to this carryout embodiment stated in above, in the gas turbine 100 of the system in which the cooling medium is communicated in the turbine rotor blades and cooled, the seal effect for reducing the leakage amount of the cooling medium and the heat shield effect for not transmitting the heat of the cooling medium to the bearing member metal 16b can be obtained, and also the manufacture cost of the gas turbine and the short period performance of the manufacture period and the vibration reduction effect due to the centering displacement restraint during the operation time can be obtained.

A second carryout embodiment according to the present invention will be explained referring to FIG. 3. In this figure, same portions equal to the portions shown in FIG. 2 are denoted by the same reference characters and the explanation thereof will be omitted. In this carryout embodiment, the centering displacement of the heat shield pipe portion of the heat shield seal pipe can be prevented surely.

Figure 3:
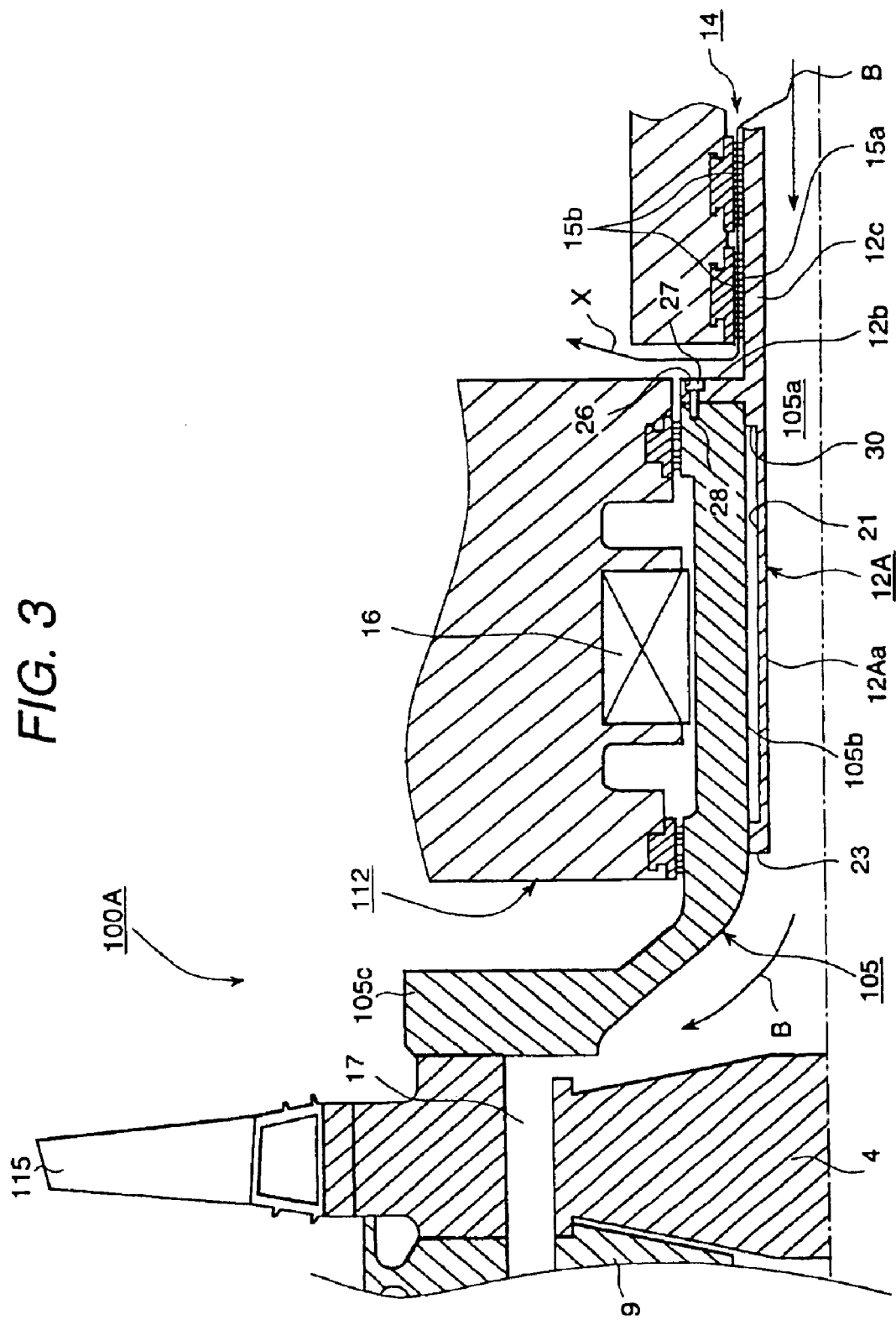
FIG. 3 is an enlarged cross-sectional view showing of an essential portion of a gas turbine according to a second embodiment of the present invention.

In FIG. 3, a heat shield seal pipe 12A provided on a gas turbine 100A according to this carryout embodiment has a heat shield pipe portion 12Aa and this heat shield pipe portion 12Aa forms a second contact portion 30 which contacts to an inner wall 105b of the rear portion shaft 105 in the rear portion side, namely in the position where the flange portion 12b is positioned.

The effect of the present carryout embodiment constituted in above will be explained.

In the gas turbine of the first carryout embodiment shown in FIG. 2, the portion for restricting the radial direction movement of the heat shield seal pipe 12 is only the contact portion 23 which is provided in the tip end of the heat shield seal pipe 12. Herein, the heat shield seal pipe 12 is fixed to the rear portion end face of the rear portion shaft 105 by the flange portion 12b through the bolt, normally since an inner diameter of the bolt insertion hole of the flange portion 12b is formed larger than an outer diameter of the bolt, even it is fixed through the bolt, there is a possibility in which the heat shield seal pipe may move with a difference part between the inner diameter of the bolt insertion hole and the outer diameter of the bolt in the radial direction, and then the radial direction movement of the heat shield seal pipe 12 can not restricted.

In the gas turbine 100A according to this carryout embodiment, an outer peripheral side of the heat shield pipe portion 12Aa contacts to the contact portion 23 in a front side from the bearing member metal 16, a contact portion 30 in a rear side from the bearing member metal 16, and the inner wall 105b of the rear portion shaft 105. For this reason, since the radial direction movement of the heat shield seal pipe 12A is restricted according to two portions of the front side and the rear side of the bearing member metal 16, the radial direction movement of the heat shield seal pipe 12A can be restricted. As stated in above, when the radial direction movement of the heat shield seal pipe 12A is restricted, the vibration generated by the centering displacement between the heat shield seal pipe 12A and the rear portion shaft 105 during the operation time can be restricted surely.

The third carryout embodiment according to the present invention will be explained referring to FIG. 2 and FIG. 3.

This carryout embodiment is that the contact portion 23 or the contact portions 23 and 30 of the heat shield seal pipe 12 or the heat shield pipe portions 12a or 12Aa in the first carryout embodiment and the second carryout embodiment is formed with the fitting-into construction having a fasten tolerance.

In the first carryout embodiment, the outer peripheral side of the heat shield pipe portion 12a of the heat shield seal pipe 12 is the inner wall 105b of the rear portion shaft 105 in the contact portion 23. However, the outer diameter of the outer peripheral portion of the contact portion 23, even after the manufacture it has the scattering within the tolerance range. For this reason, the contact portion 23 does not contact in the whole peripheral direction and several gaps rare formed in the peripheral direction between the inner wall 105b of the rear portion shaft 105 and the outer peripheral side of the contact portion 23. When theses gaps exist, since the cooing medium supplied from the rear portion of the rear portion shaft 105 enters into the air layer 21, the heat shield effect for not transmitting the heat of the cooling medium to the rear portion shaft 105 lowers. The contact portions 23 and 30 in the second carryout embodiment will be same similarly to the above. In this carryout embodiment, to the contact portion 23 of the heat shield seal pipe 12 or 12A the fasten tolerance is provided and the shrinkage fitting or the cooling fitting is carried out and then the whole outer peripheral side of the contact portion 23 can be adhered closely to the inner wall 105b of the rear portion shaft 105. As a result, the entering of the cooling medium to the air layer can be prevented and the heat of the cooing medium hardly transmits to the bearing member metal 16 and then the lowering of the heat shield effect according to the heat shield seal pipe 12 or 12A can be prevented.

A fourth carryout embodiment according to the present invention will be explained referring to FIG. 4. In this figure, same portions equal to the portions shown in FIG. 2 and FIG. 3 are denoted by the same reference characters and the explanation thereof will be omitted. In this carryout embodiment, the scattering of the destroyed portion due to the movement of the destroyed portion during the destroy time of the heat shield pipe portion can be prevented.

Figure 4:
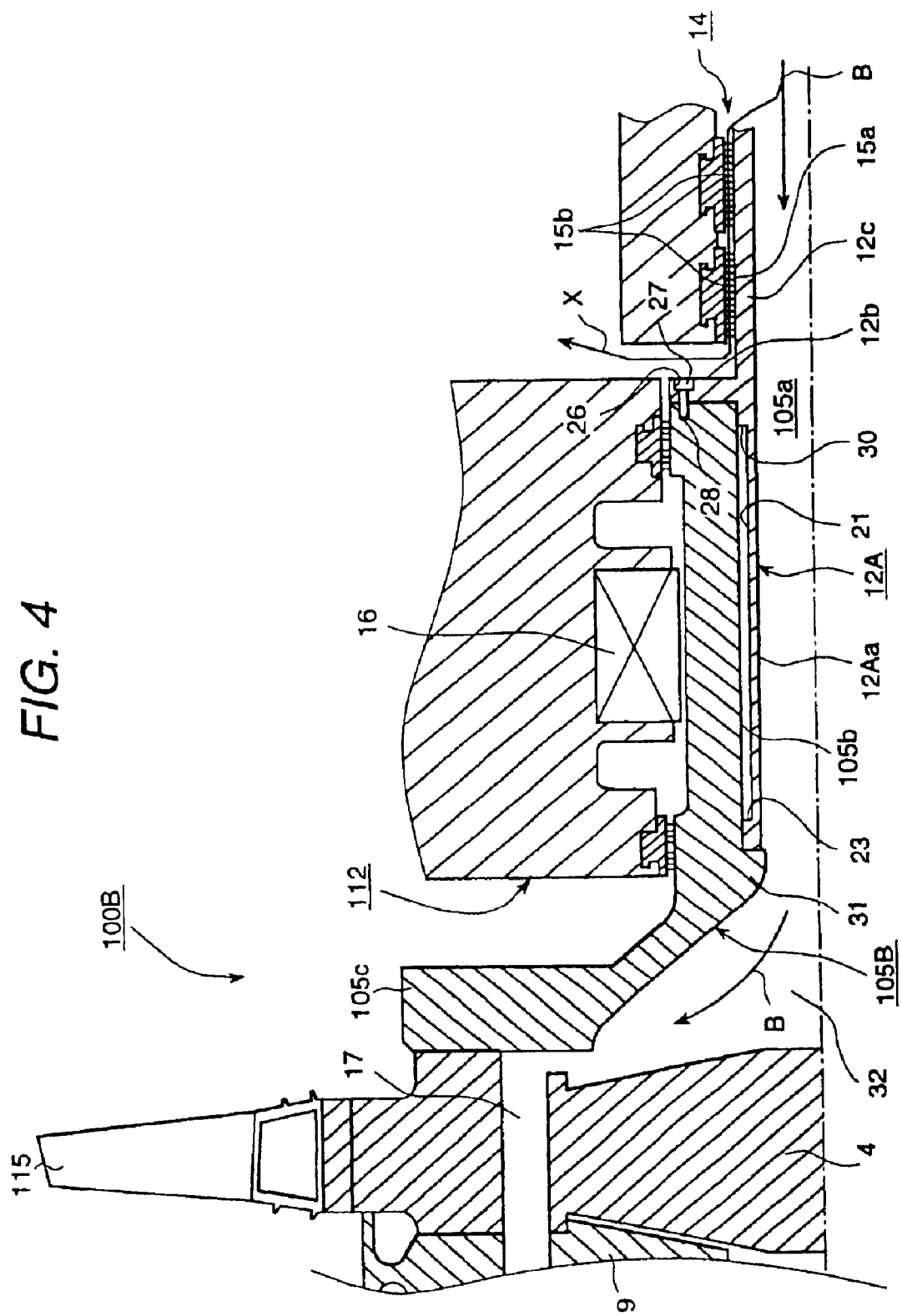
FIG. 4 is an enlarged cross-sectional view showing of an essential portion of a gas turbine according to a fourth embodiment of the present invention.

In FIG. 4, to a rear portion shaft 105B of a gas turbine 100B according to this carryout embodiment, so as to contact to the end face of the inner wall 105b portion which is arranged adjacently to a front portion side end face of a tip end portion of the heat shield pipe portion 12Aa, a cylindrical shape radial direction projection portion 31 is provided.

The effects of this carryout embodiment constituted in above will be explained.

During the operation time, even when the heat shield pipe portion 12Aa of the heat shield seal pipe 12A destroys between the contact portion 23 and the contact portion 30, and the front side destroyed portion is cut from the rear side thereof, since the front side destroyed portion contacts to the projection portion 31 provided to the inner wall 105b of the rear portion shaft 105, the movement to the before from the projection portion 31 can be stopped. If the front portion destroyed portion moves toward the front side from the projection portion 31, the front portion destroyed portion scatters in a front portion wide space in the rear portion shaft 105 and collides with the turbine disc and the big vibrations generate, according to the circumstances there is a possibility in which the turbine disc may be destroyed. In this carryout embodiment, by the provision of the projection portion 31 to the inner wall 105b of the rear portion shaft 105, the generation of the above stated situation can be avoided.

Further, in the carryout embodiments stated in above, the closed cooling system for recovering the cooling medium from the front portion of the turbine part is exemplified, however the present invention is not limited to this, the present invention will adopt to the open cooling system for exhausting the cooling medium to the combustion gas, in this time the effects similar to the above can be obtained.

According to the present invention, in the gas turbine in which the cooling medium is cooled by communicating the cooling medium in the turbine rotor blades, the heat shield is effective for reducing the transmission of the heat of the cooling medium to the bearing member metal. Further, the component number for bolt connecting to the rear portion shaft becomes one, and the structure is simple and the manufacture performs easily and further during the operation time the vibrations according to the centering displacement hardly generate.

Further, according to the present invention, since between the first contact portion and the inner wall of the rear portion shaft is fitted into closely ranging over the whole periphery thereof, the entering of the cooling medium to the air layer can be prevented and the lowering in the heat shield effect to the bearing member metal can be prevented.

Further, according to the present invention, at the worst the heat shield pipe portion may destroy, by the projection portion the front direction movement of the destroyed component can be stopped and then the scattering of the destroyed component in the front portion space of the rear portion shaft can be prevented.

What is claimed is:

1. In a gas turbine comprising a turbine disc for constituting a turbine rotor and a rear portion shaft connected thereto in a downstream side of a gas path of said turbine disc and supported by bearing members having a bearing member metal in a main body stationary side, a cooling medium passage formed inside said turbine disc, a center hole for communicating a cooling medium formed in said rear portion shaft, said cooling medium is supplied from a rear portion side of said rear portion shaft to said center hole, said cooling medium is communicated in an axial direction from a rear portion side to a front portion side in said center hole and to said disc cooling medium passage, said cooling medium is communicated to turbine rotor blades which are cooled, a cooling medium recovery communication passage for recovering said cooling medium after cooling from a front portion side of the turbine, and a recovery means for recovering said cooling medium from said cooling medium recovery communication passage, the gas turbine further comprising:

a heat shield pipe in which a heat shield pipe portion arranged in said center hole of said rear portion shaft and contacting an inner wall of said rear portion shaft at a first contact portion which is positioned in a front portion side within an axial direction range of said bearing member metal and for forming an air layer between said inner wall of said rear portion shaft and said heat shield pipe portion, a seal shaft portion positioned in a rear portion of said heat shield pipe portion for preventing leakage of said cooling medium between a face of said seal shaft portion opposed to said main body stationary side and said main body stationary side, and a flange portion positioned between said heat shield pipe portion and said seal shaft portion, are constructed as a single piece component.

2. A gas turbine according to claim 1, wherein said heat shield pipe portion of said heat shield seal pipe has a second contact portion for contacting said inner wall of said rear portion shaft in an axial direction portion of said rear portion side of an axial direction range to which said bearing member metal is positioned.

3. A gas turbine according to claim 1, wherein said heat shield pipe portion of said heat shield seal pipe has at least said first contact portion for forming a fastening tolerance having a fit-into construction.

4. In a gas turbine comprising a turbine disc for constituting a turbine rotor and a rear portion shaft connected thereto in a downstream side of a gas path of said turbine disc and supported by bearing members having a bearing member metal in a main body stationary side, and a center hole formed in said rear portion shaft for supplying a cooling medium into said rear portion shaft, the gas turbine further comprising;

along an inner wall of said center hole of said rear portion shaft, a cylindrical shaped member extending from an upstream side in an axial direction of said bearing member metal to said main body stationary side;

to fasten to an end face of a rear portion of said rear portion shaft, a flange formed on said cylindrical shaped member and extending outwardly in a radial direction of said turbine rotor; and a first contact portion formed on said cylindrical shaped member and contacting said inner wall of said center hole of said rear portion shaft in an upstream side in an axial direction of said bearing member metal, an air layer formed between said inner wall of said rear portion shaft and said cylindrical shaped member, and a second radially outer contact portion formed on said cylindrical shaped member and contacting said inner wall of said center hole of said rear portion shaft on a downstream side in said axial direction of said bearing member metal.

5. In a gas turbine comprising a turbine disc for constituting a turbine rotor and a rotary portion having a rear portion shaft supported by bearing members, and a center hole formed in said rear portion shaft for supplying a cooling medium into said rear portion shaft from a side opposite to said turbine rotor which forms a stationary portion side, the gas turbine further comprising:

along an inner wall of said center hole of said rear portion shaft, a cylindrical shaped member extending from a upstream side in an axial direction of said turbine rotor to said stationary portion side;

to fasten to an end face of a rear portion of said rear portion shaft in an axial direction of said turbine rotor, a flange portion formed on said cylindrical shaped member and extending outwardly in a radial direction of said turbine rotor; and a first contact portion formed on said cylindrical shaped member and contacting said inner wall of said center hole of said rear portion shaft on an upstream side in an axial direction of said hearing member metal, an air layer formed between said inner wall of said rear portion shaft and said cylindrical shaped member, and a second radially outer contact portion formed on said cylindrical shaped member and contacting said inner wall of said center hole of said rear portion shaft on a downstream side in said axial direction of said bearing member metal.

* * * * *